United States Patent [19]

Wells et al.

[11] 4,343,034

[45] Aug. 3, 1982

[54] MAGNETIC AMPLIFIER PREREGULATOR FOR LINEAR POWER SUPPLIES

[75] Inventors: Richard B. Wells, Boise; Chester G. Haibel, Jr., Meridian; Richard L. Hilton, Boise, all of Id.

[73] Assignee: Hewlett-Packard Company, Palo Alto, Calif.

[21] Appl. No.: 179,417

[22] Filed: Aug. 18, 1980

[51] Int. Cl.³ ........................ H02P 13/24; G05F 1/22

[52] U.S. Cl. ........................................ 363/82; 323/251; 363/90

[58] Field of Search .................................... 363/89–93, 363/67, 101, 82; 323/249, 266, 267, 280, 253, 251; 307/31, 33, 34, 39

[56] References Cited

U.S. PATENT DOCUMENTS 1,479,561 1/1924 Stoekle .................................. 363/92
3,065,399 11/1962 McNamee .............................. 363/90
3,431,429 3/1969 Phillips .................................. 307/31
3,654,545 4/1972 Demark ............................... 323/280
4,144,463 3/1979 Sugiura ................................ 307/33

FOREIGN PATENT DOCUMENTS 676566 12/1963 Canada ................................. 363/91
647056 10/1962 Italy ..................................... 363/91

*Primary Examiner*—William H. Beha, Jr.
*Attorney, Agent, or Firm*—Jon R. Stark

[57] ABSTRACT

A linear power supply is preregulated to compensate for variations in load and power line voltage. The inductance on the primary side of the power supply step down transformer is varied by a current controlled inductor to efficiently maintain the desired power supply output voltage. A variable current is supplied to the inductor by a d.c. power source under control of an integrator which monitors output voltage fluctuations. In one embodiment of the invention, a voltage selector is included for use with power supplies which provide more than one output voltage. This selector automatically selects the most heavily loaded output voltage for control of the inductor.

1 Claim, 3 Drawing Figures

MAGNETIC AMPLIFIER PREREGULATOR FOR LINEAR POWER SUPPLIES

BACKGROUND OF THE INVENTION

Linear power supplies use a transformer to step down a.c. line voltage. Because a.c. line voltage commonly varies widely with time, the transformer must be designed to provide a minimum acceptable output voltage when the line voltage is at its lowest anticipated value. A series pass regulator circuit is sometimes used to provide a variable resistance so that the voltage delivered by the power supply is kept at a constant value.

Such power supplies are inefficient in high power applications. Power dissipated in the series pass regulator is much higher than it would be if varying line voltage conditions could be ignored in designing the power supply.

One prior art attempt to eliminate this inefficiency was to use a three-winding ferro-resonant transformer in place of the usual step down transformer. The ferro-resonant transformer maintained a constant output voltage by producing a magnetic resonance at a particular line frequency. The transformer core could then partially saturate in response to line voltage increases, thus decreasing transformer efficiency and stabilizing the output voltage. However, ferro-resonant transformers suffered the disadvantage that the resonance occurred only for a very small frequency range. Actual power line frequencies may vary over wide ranges (48–66 Hz) for which the ferro-resonant transformer performed as poorly as a standard step down transformer. An additional problem was the high cost of ferro-resonant transformers as compared to standard transformers.

Another prior art attempt to reduce inefficiency was the use of a switching regulator. Two switches were alternately opened and closed to produce a high frequency square wave to be applied to the step down transformer. The stepped voltage was dependent upon the frequency of switching and upon the interval each switch remained closed. The efficiency of these devices was independent of line voltage or line frequency fluctuations. However, there were disadvantages to these devices. First, the strong electromagnetic fields created by the switching action could lead to conduction of energy back into the power line, producing interference with other electrically powered devices. Also, the voltage amplitude of the square wave could be as high as 180 volts, requiring costly shielding to protect service personnel from shock hazards. Finally, switching regulators added a factor of unreliability because component aging could change switching speeds. Degradation in switch timing could also lead to simultaneous closing of the switches, producing fire and explosion hazards from a short circuit across a high potential difference.

SUMMARY OF THE INVENTION

In accordance with the preferred embodiment of the present invention, a linear power supply is preregulated to compensate for variations in power line voltage. The preferred embodiment includes a current controlled inductor called a "transductor", a d.c. source, and an integrator. Output voltage from a linear power supply and a reference voltage are provided to the integrator, which controls the d.c. source. Current from the d.c. source determines the inductance of the transductor which is coupled to the primary side of the power supply step down transformer. The resulting inductance on the primary side compensates for power line voltage fluctuations, so that the desired power supply output voltage is efficiently maintained. Another embodiment of the invention includes a minimum voltage selector for use with power supplies which provide more than one output voltage. By normalizing and comparing the output voltages, the minimum voltage selector selects the most heavily loaded output circuit for preregulation.

DESCRIPTION OF THE PREFERRED EMBODIMENTS

Figure 1:
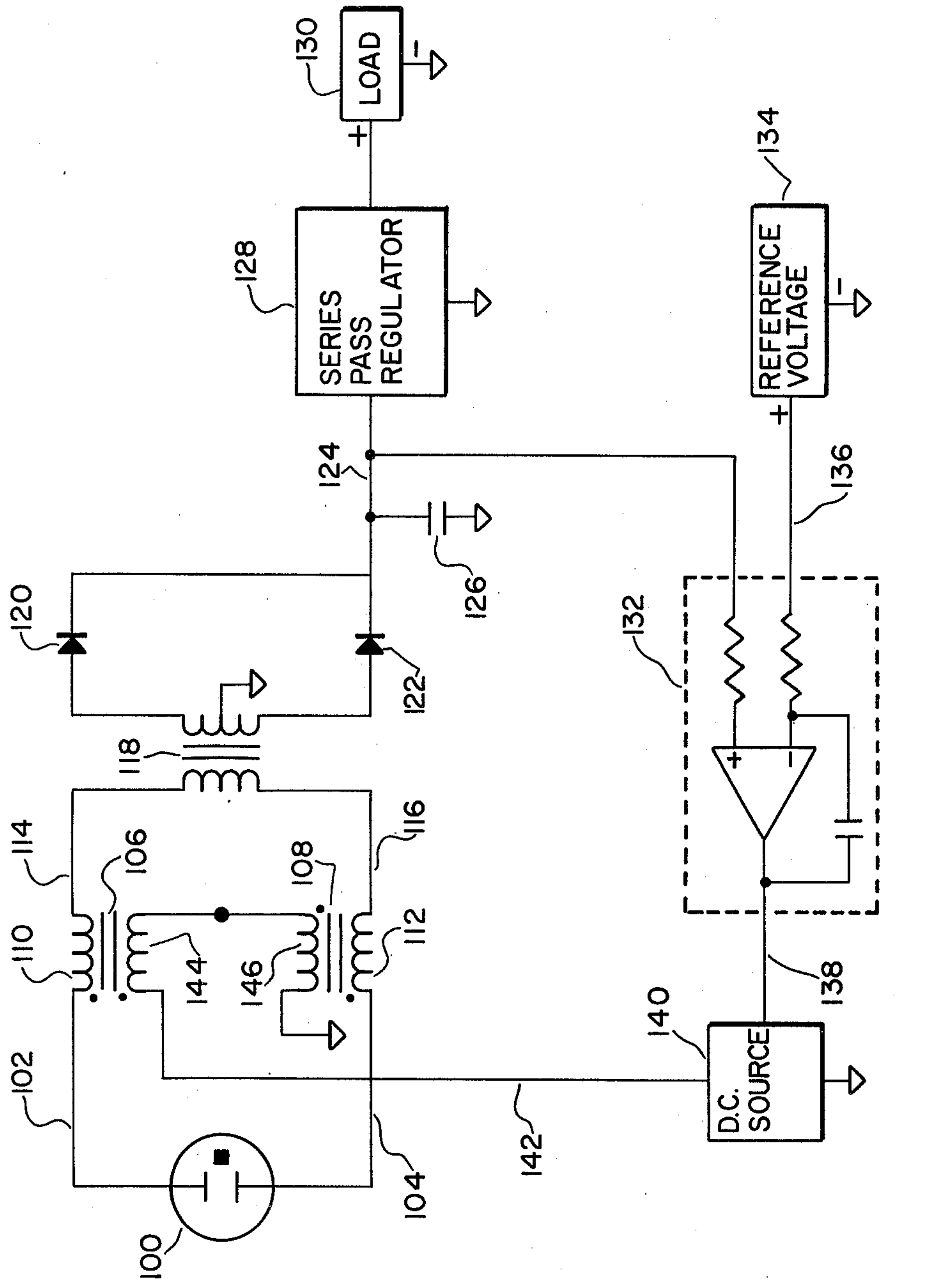
FIG. 1 is a schematic diagram of a linear power supply in accordance with an embodiment of the invention.

Referring to FIG. 1, an a.c. power line source 100 is coupled via lines 102 and 104 to iron core transformers 106 and 108. An a.c. output signal is produced in transformer windings 110 and 112. Lines 114 and 116 carry the output signal to transformer 118 which applies a stepped-down voltage to rectifiers 120 and 122, thereby producing a d.c. voltage on line 124 and across capacitor 126. Series pass regulator 128 acts as a variable resistance to regulate the voltage of the signal delivered to load 130.

The signal on line 124 is input to integrator 132. Reference voltage 134 provides the reference signal on line 136 to integrator 132. In response to the reference signal and the input signal, integrator 132 produces a control signal which is carried by line 138 to d.c. source 140. D.C. source 140 produces a current through line 142 and adjusts the current level in response to the control signal. The current from line 142 passes through series connected winding 144 and 146 of transformers 106 and 108. Transformers 106 and 108 together form a transductor.

Any change in voltage at capacitor 126 due to variations in power line voltage at source 100 will cause a change in the input signal along line 124 to integrator 132. Integrator 132 then responds by changing the voltage of the control signal on line 138. In response to the control signal change, source 140 adjusts the current applied to windings 144 and 146, so that the current varies inversely with the control signal voltage. The current change in windings 144 and 146 produces a change in inductance in windings 110 and 112. This change in inductance on the primary side of step down transformer 118 compensates for the variation in line voltage and maintains the voltage at capacitor 126 at the desired value.

Integrator 132 may be a high gain operational amplifier with a capacitor as a feedback element. Integrator 132 continuously compares the voltages on lines 124 and 136, changing its output on line 138 until the voltages on lines 124 and 136 match. A simple inverting linear amplifier may be used for d.c. source 140, to invert the signal on line 138 and provide power gain to amplify the power available at the output of integrator 132. The voltage out of d.c. source 140 is thus inversely proportional to the voltage into it for the polarities shown in FIG. 1.

Two small, low-voltage step-up transformers with ordinary primary windings may be used for transformers 106 and 108. The transformer cores need not be specially saturable, other than the normal characteristics of most standard silicon steel laminated cores. The secondaries 144, 146 are wired together so that the secondary voltages will nominally cancel, so that d.c. source 140 does not have to drive current into a source of voltage.

Figure 2:
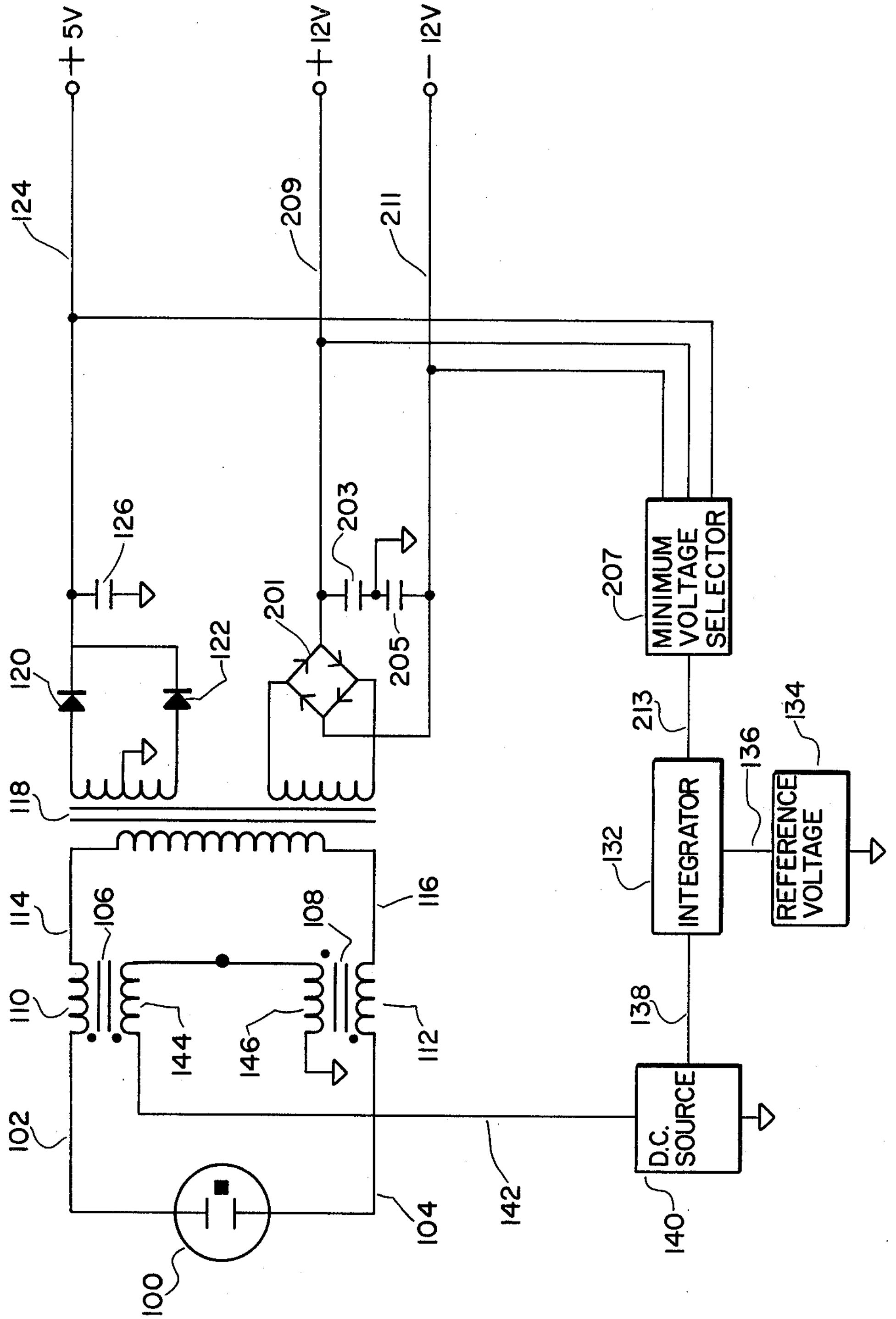
FIG. 2 is a schematic diagram of a linear power supply in accordance with another embodiment of the invention including a minimum voltage selector.

In FIG. 2 there is shown a variation of the basic circuitry shown in FIG. 1. Reference numbers 100–126 and 132–146 in FIG. 2 refer to the same numbered items in FIG. 1. The circuitry of FIG. 2 includes a bridge 201 and a pair of capacitors 203 and 205 to provide additional output voltages for the power supply. Since the loads placed on each output voltage circuit may be different, it is desirable to select the most heavily loaded circuit for preregulation, to achieve maximum efficiency. To determine which circuit should be preregulated, a minimum voltage selector 207 is provided to normalize and compare the voltages on lines 124, 209, and 211. The most heavily loaded line will have the lowest normalized voltage. Selector 207 selects the lowest normalized voltage, and provides the input signal to integrator 132 via line 213.

Figure 3:
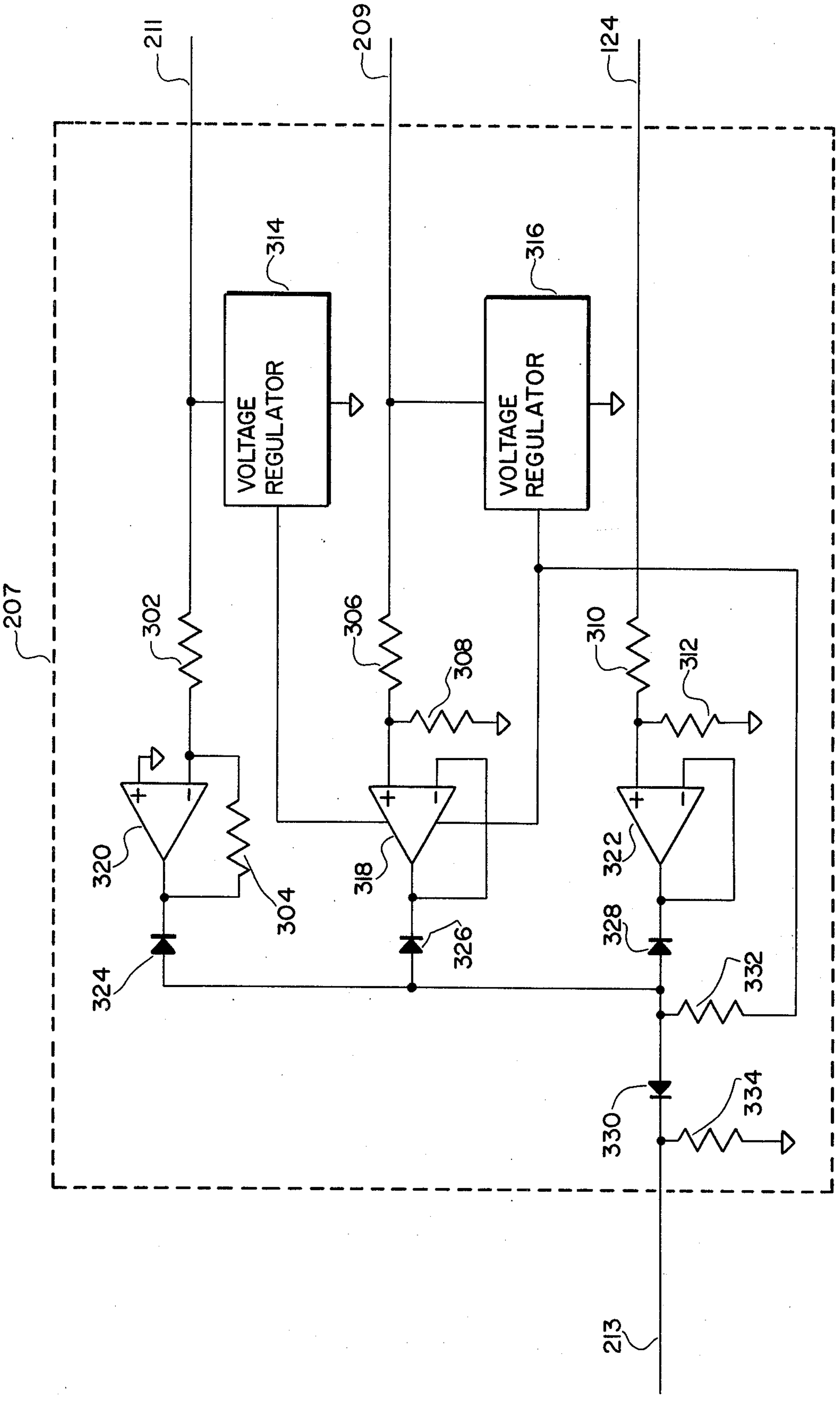
FIG. 3 is a schematic diagram of an embodiment of the minimum voltage selector of FIG. 2.

FIG. 3 shows a circuit for minimum voltage selector 207 of FIG. 2. Reference numbers 124 and 207–213 of FIG. 3 refer to the same numbered items of FIG. 2. Resistors 302 and 304 of FIG. 3 are scaling resistors which normalize the voltage on line 211. Resistors 306 and 308 similarly normalize the voltage on line 209, while resistors 310 and 312 normalize the voltage on line 124. Voltage regulators 314 and 316 provide regulated signals from lines 21 and 209 to operational amplifiers 318, 320, and 322. Operational amplifiers 318, 320, and 322, together with diodes 324, 326, 328, and 330, and resistors 332 and 334, form an analog logic circuit whose output voltage is the least of the three normalized voltages. The minimum normalized voltage, corresponding to the most heavily loaded output circuit, is thus selected and provided on line 213 for use by integrator 132 of FIG. 2 so that preparation is controlled by the most heavily loaded circuit.

We claim:

1. A magnetic amplifier preregulator comprising:

transductor means having an inductance variable over a predetermined range of inductances in response to a first electrical signal for providing an a.c. output signal;

d.c. source means coupled to the transductor means for providing the first electrical signal and for varying the current of the first electrical signal in response to a second electrical signal;

integrator means coupled to the d.c. source means for providing the second electrical signal in response to an input signal and to a reference signal; and minimum voltage selector means for comparing a plurality of voltages, for selecting the lowest valued of the plurality of voltages, and for providing the input signal to the integrator means.

* * * * *